(12) United States Patent
Bosch et al.

(10) Patent No.: US 12,450,539 B2
(45) Date of Patent: Oct. 21, 2025

(54) METADATA-BASED RECOMMENDATIONS OF WORKFLOWS FOR DATA FILES

(71) Applicant: Procore Technologies, Inc., Carpinteria, CA (US)

(72) Inventors: Matthew Croy Bosch, Satellite Beach, FL (US); Riley Scott Herman, Austin, TX (US); Dallas Hall, Marysville, WA (US); Kathryn Gallagher, Austin, TX (US)

(73) Assignee: Procore Technologies, Inc., Carpinteria, CA (US)

( * ) Notice: Subject to any disclaimer, the term of this patent is extended or adjusted under 35 U.S.C. 154(b) by 85 days.

(21) Appl. No.: 17/578,894

(22) Filed: Jan. 19, 2022

(65) Prior Publication Data

US 2023/0230006 A1    Jul. 20, 2023

(51) Int. Cl.
*G06Q 10/00* (2023.01)
*G06Q 10/0633* (2023.01)
*G06Q 50/08* (2012.01)

(52) U.S. Cl.
CPC ......... *G06Q 10/0633* (2013.01); *G06Q 50/08* (2013.01)

(58) Field of Classification Search
CPC .................................................. G06Q 10/30
See application file for complete search history.

(56) References Cited

U.S. PATENT DOCUMENTS

| 8,843,535 | B2 | 9/2014 | Prasad et al. |
| 8,903,761 | B1 | 12/2014 | Zayas et al. |
| 9,104,719 | B2 | 8/2015 | Leggette |
| 9,275,144 | B2 | 3/2016 | Pan et al. |
| 10,303,690 | B1 | 5/2019 | Todd et al. |
| 11,106,678 | B2 | 8/2021 | Dageville et al. |
| 2007/0192377 | A1 | 8/2007 | Gies |

(Continued)

FOREIGN PATENT DOCUMENTS

| KR | 10-2195899 B1 | 12/2020 |
| WO | WO-2020230154 A1 * | 11/2020 |

OTHER PUBLICATIONS

Alhoz, Khaled, "Information Management Workflows Aligned with ISO 19650 Principals in the ArcGIS Platform—Delivery Phase of an Asset", ISO 19650 Standards in the ArcGIS Platform, Aug. 30, 2021, 20 pages, printed from the World Wide Web on Dec. 31, 2021.

(Continued)

*Primary Examiner* — Hafiz A Kassim
*Assistant Examiner* — Zahra Elkassabgi
(74) *Attorney, Agent, or Firm* — Lee Sullivan Shea & Smith LLP

(57) ABSTRACT

A computing platform is configured to: (i) receive, from a first client station, a data file; (ii) obtain metadata associated with the data file; (iii) determine, based on the obtained metadata, at least one recommended workflow for assignment to the data file, wherein the workflow defines a set of one or more actions that are to be taken in connection with the data file; and (iv) transmit, to a second client station, a communication identifying the at least one recommended workflow and thereby cause an indication of the at least one recommended workflow for the data file to be presented at a user interface of the second client station.

17 Claims, 8 Drawing Sheets

(56) References Cited

U.S. PATENT DOCUMENTS

| | | | |
|---|---|---|---|
| 2013/0091105 | A1 | 4/2013 | Bhave et al. |
| 2014/0019494 | A1 | 1/2014 | Tang |
| 2016/0162478 | A1* | 6/2016 | Blassin .......... G06Q 10/063112 706/12 |
| 2019/0129955 | A1 | 5/2019 | Greenberger et al. |
| 2019/0197124 | A1 | 6/2019 | Kaneko et al. |
| 2020/0042498 | A1 | 2/2020 | Zwiefelhofer et al. |
| 2020/0097565 | A1 | 3/2020 | Males et al. |
| 2020/0151142 | A1 | 5/2020 | Mamidi et al. |
| 2020/0226182 | A1* | 7/2020 | Dang ............. G06Q 10/063118 |
| 2021/0109984 | A1 | 4/2021 | Cohen et al. |
| 2021/0271636 | A1* | 9/2021 | Watanabe ............... G06F 16/93 |
| 2021/0271716 | A1 | 9/2021 | Watanabe |
| 2021/0397670 | A1 | 12/2021 | Cohen et al. |

OTHER PUBLICATIONS

Yee, Angela et al., "ISO 19650, the Common Data Environment, and Autodesk Construction Cloud" (https://medium.com/autodesk-university/iso-19650-the-common-data-environment-and-autodesk-construction-cloud-d97a9d9a17af), Autodesk University, Jun. 23, 2021, 11 pages, printed from the World Wide Web on Mar. 28, 2022.

"A Simple BIM Naming Convention Based on ISO 19650 Part 1," (https://www.bimicon.com/bim-naming-convention-based-on-iso19650-part1/), BIM ICON, 2021, 9 pages, printed from the World Wide Web on Mar. 28, 2022.

"Customize an Applied Naming Standard," (https://knowledge.autodesk.com/search-result/caas/CloudHelp/cloudhelp/ENU/BIM360D-Document-Management/files/common-data-environment/Customize-Naming-Standard-html.html), Knowledge Network, Jan. 4, 2022, 9 pages, printed from the World Wide Web on Jan. 16, 2022.

U.S. Appl. No. 17/702,314, filed Mar. 23, 2022, with inventors Bosch, Matthew Croy et al., entitled "Metadata-Based Recommendations of File Names."

Screen captures from YouTube video clip entitled "Autodesk Naming Standard to ISO 19650 Workflows," uploaded on Nov. 9, 2021, 40 pages, Retrieved from Internet: https://www.youtube.com/watch?v=IEF7RJCRV7c on Apr. 1, 2022.

Screen captures from YouTube video clip entitled "Autodesk BIM 360 Docs—ISO 19650 Naming Containers," uploaded on May 25, 2021, 47 pages, Retrieved from Internet: https://www.youtube.com/watch?v=j_080pNiFA on Apr. 1, 2022.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

International Searching Authority, PCT International Search Report and Written Opinion, PCT International Application No. PCT/US2023/015936, Jun. 29, 2023, 10 pages.

* cited by examiner

METADATA-BASED RECOMMENDATIONS OF WORKFLOWS FOR DATA FILES

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

When approaching, planning, and carrying out a construction project, it is often necessary to control and manage data files associated with the construction project to ensure that such data files are appropriately created, captured, accessed, managed, and stored (e.g., in a manner that reflects business, corporate and regulatory compliance requirements). To assist with these tasks, software applications have been developed that enable control and management of electronic data files associated with construction projects. However, because construction projects may be complex endeavors involving multiple different phases, large numbers of data files (which may be on the order of thousands, tens of thousands, hundreds of thousands, etc.), and coordination of multiple different teams of individuals, organizations may face various challenges when attempting to use existing software applications to control and manage data files associated with construction projects, examples of which may include PDF files, JPEG files, DWG files, Building Information Model (BIM) files, and Computer-Aided Design (CAD) files (e.g., NWF files), among other possible file types.

One example challenge faced by organizations attempting to control and manage data files associated with a construction project is that, without appropriate control mechanisms in place, there is a risk that unreliable, inaccurate, and/or out-of-date data files could be disseminated among teams and individuals involved in the construction project, which may lead to a host of problems on the construction project—including scheduling delays and other costly mistakes. To address this challenge, technology is now being developed to help control the reliability and quality of data files that are disseminated among teams and individuals involved in the construction project.

For instance, some software applications have begun to implement approaches for controlling and managing data files associated with a construction project whereby all new data files uploaded to the software application are required to undergo a review and approval process before such data files can be disseminated to others involved in the construction project. A framework for such an approach is defined in International Organization for Standardization (ISO) 19650, which is an international standard for managing information over the lifecycle of a built asset. A software application designed in accordance with ISO 19650 may maintain a centralized repository that serves as the single source of truth for electronic data files associated with a construction project, which is referred to as a common data environment (CDE), and may then impose certain requirements that each data file associated with the construction project needs to meet before it can be placed into the CDE—including undergoing an appropriate review and approval process.

In this regard, different data files may give rise to different review and/or approval actions that should be carried out in connection with the data file, which may depend on factors such as the type of data file, the version of the data file, and the suitability status of the data file, among other possibilities. For instance, a first data file may require a first set of review and/or approval actions to be carried out before it can be disseminated to other individuals involved in a construction project (e.g., review by an individual having a first type of role within an organization), while a second data file may require a second, different set of actions to be carried out before it can be disseminated to other individuals involved in a construction project (e.g., approval by an individual having a second type of role within an organization). Because of this, each data file that is uploaded to a software application employing a CDE-type approach will generally need to be evaluated to determine the particular set of review and/or approval actions that needs to be carried out for the data file, and once that particular set of review and/or approval actions is determined, those actions can then be carried out so that the data file can be promoted to the CDE. However, as the number of data files associated with a construction project increases, the task of evaluating and determining the appropriate set of review and/or approval actions to be carried out for each of the respective data files is a cumbersome, labor intensive, and time-consuming process.

One possible way to help streamline the task of evaluating and assigning the appropriate set of review and/or approval actions to be carried out for data files associated with a construction project is to predefine a collection of review and approval "workflows" that each comprises a particular set of one or more the review and/or approval actions to be carried out with respect to a data file, and then to utilize these predefined workflows to assign the appropriate review and/or approval actions to be carried out for the data files (as opposed to assigning individual review and/or approval actions for each data file). Various types of workflows for data files are possible, and in at least some implementations, these workflows could be defined in accordance with a standard such as ISO 19650. As one example, a workflow may comprise an action for a particular individual, an individual having a particular role within an organization (e.g., a document controller, designer, project manager, etc.), or a particular organization to review and/or approve a data file. As another example, a workflow may comprise a particular sequence of multiple actions for different individuals (e.g., individuals having different roles within an organization) to review and/or approve a data file. Other examples are possible as well.

Yet, even with the use of predefined workflows, the task of evaluating and determining the appropriate set of review and/or approval actions to be carried out for each of the respective data files remains a cumbersome, labor intensive, and time-consuming process. Indeed, most existing software applications that include this functionality require users to assign workflows to data files on a file-by-file basis. For instance, these existing software applications may provide an interface that allows a given user to review each data file that has been uploaded and then input a selection of a particular workflow to assign to the data file via a drop-down list or the like, so as to cause the workflow for that data file to be carried out.

However, such user-driven assignment of workflows on a file-by-file basis (also referred to herein as a "user-driven, file-based approach") gives rise to various problems. As one example, this user-driven, file-based approach for assigning workflows to data files can be a cumbersome, labor intensive, and time-consuming process, particularly in view of the large number of data files that are likely to be uploaded throughout the course of a construction project. As another example, this user-driven, file-based approach for assigning workflows to data files may be prone to user error, such as a user selecting an inappropriate workflow to assign to a data file. In this respect, selecting an inappropriate workflow may, in some examples, result in a failure to comply with a standard (e.g., ISO 19650) that is being used to govern the construction project. The user-driven, file-based approach for assigning workflows to data files may give rise to other problems as well.

In an effort to alleviate some of these problems, a software application could employ a modified user-driven approach whereby the software application enables users to preassign workflows to certain folders within a folder structure for storing data files and then automatically assigns workflows to data files based on the folders where those data files are stored.

However, this modified user-driven approach for assignment of workflows (also referred to herein as a "user-driven, folder-based approach") also gives rise to various problems. As one example, such a user-driven, folder-based approach for assigning workflows to data files still requires users to create the folder structure, preassign the workflows to the folders, and then place each uploaded data file into the appropriate folder, which is still a cumbersome, labor intensive, and time-consuming process, particularly in view of the large number of data files that are likely to be uploaded throughout the course of a construction project. As another example, this user-driven, folder-based approach for assigning workflows to data files is still prone to user error. For example, a user may assign an inappropriate workflow to a folder or place a data file in an incorrect folder, which may result in an inappropriate workflow being assigned to the data file. The user-driven, folder-based approach for assigning workflows to data files may give rise to other problems as well.

To help address the aforementioned and other problems, disclosed herein is new software technology for assigning workflows to data files based on metadata (which may also be referred to as "attributes") associated with the data files. In practice, the disclosed software technology could be implemented in a software as a service ("SaaS") application for construction management, such as the SaaS application offered by Procore Technologies, Inc., but it should be understood that the disclosed technology for assigning workflows to data files may be incorporated into various other types of software applications as well (including software applications for managing data files in industries other than construction).

In accordance with the disclosed technology, a computing platform is configured to receive a data file and obtain metadata associated with the data file. The computing platform may receive data files and obtain metadata associated with those data files in various ways. In some implementations, a user may upload data files (e.g., PDF files, JPEG files, DWG files, BIM files, CAD files, etc.) associated with a construction project through a client station running front-end software for a SaaS application, and this then results in the data files associated with the project being transmitted by the client station to a computing platform running back-end software for the SaaS application via the Internet and then being stored by the computing platform for future access. In addition to receiving data files, the computing platform may obtain metadata associated with received data files, which may generally comprise data that provides information about the data files. In practice, a data file may have any of various associated metadata fields, examples of which may include fields that respectively contain information such as original and/or current file name, file type (e.g., drawing, specification, model, photo, etc.), description, suitability status (e.g., S1 (suitable for coordination), S2 (suitable for information), S3 (suitable for review & comment), S4 (suitable for stage approval), etc.), trade (e.g., electrical, plumbing, etc.), stage (e.g., preconstruction, design, bidding, construction, closeout, maintenance, etc.), classification (e.g., sub-type of document, such as elevation drawing, plan view drawing, etc.), volume/system (e.g., zone of project), location (e.g., building, level of building, etc.), originator (e.g., the individual or organization that uploaded the data file), original file format, file size, due date, revision, permissions, date created, date uploaded, storage zone (e.g., zone where the data is stored or to be stored), and/or current assignee. Other metadata is possible as well.

Further, the universe of metadata fields for which metadata may be obtained for a given data file may depend on any of various factors, examples of which may include the nature of the data files being evaluated (e.g., data files within a SaaS application for construction management versus data files within some other type of software application), the preferences of the SaaS application provider, the preferences of the user, and/or other factors that are specific to the type of SaaS application that incorporates the disclosed technology (e.g., in a SaaS application for construction management, the universe of metadata fields could depend on the specific construction project to which the data files are associated and/or the particular type of construction-related data files that are being evaluated). Other examples are possible as well.

Further yet, the computing platform may obtain the metadata in various ways. As one possibility, a given user (e.g., the user that uploaded the data file and/or a user tasked with reviewing uploaded data files) may enter certain types of information about the data file via the user's client station, and this information may thereafter be sent from the client station to the computing platform in the form of metadata that is indicative of that information—which may then be received and stored by the computing platform. As another possibility, the computing platform may automatically generate certain types of metadata based on a data file that is received. For example, a native data file being uploaded may itself comprise one or more metadata fields that are associated with the native data file (e.g., metadata generated by the application that created the data file), in which case the computing platform may extract the native metadata for certain of these metadata fields and then store it as metadata for the data file that is accessible within the SaaS application. As another example, the computing platform may perform an analysis on a data file (e.g., analysis using natural language processing (NLP) or other machine learning-based techniques), and generate certain types of metadata based on that computing-platform analysis that is then stored for the data file. Other examples of obtaining metadata (e.g., user-input metadata values and/or metadata values generated by the platform) are possible as well.

The obtained metadata may then be used by the computing platform to drive functionality for assigning workflows to data files stored within the computing platform. For instance, after obtaining and storing the metadata associated with a data file, the computing platform may then use the obtained metadata to recommend one or more workflows for the data file. In particular, the computing platform may be configured to determine, based on obtained metadata associated with the data file, at least one recommended workflow for assignment to the data file (where the recommended workflow defines a set of one or more actions that are to be taken in connection with the data file).

In accordance with the present disclosure, the workflows that may be recommended for assignment to the data files may be selected from some universe of predefined workflows that are available for assignment to data files stored within the computing platform. Such workflows may take any of various forms, and in at least some implementations, may be defined in accordance with a standard such as ISO 19650. As examples, the workflows that are available for assignment may comprise actions related to review of a data file, approval of a data file, revision of a data file, and/or other decisions related to a data file, among other possibilities. Further, in practice, the particular universe of workflows that are available for assignment to data files could be defined by the SaaS application provider, the users of the SaaS application, or some combination thereof. Further yet, the particular universe of workflows that are available for assignment to data files could vary based factors such as the specific construction project to which the data files are associated and/or the particular type of construction-related data files that are being evaluated, among other possibilities.

A computing platform operating in accordance with the disclosed technology may determine the one or more recommended workflows for the data file based on the obtained metadata associated with the data file in various ways, and in at least some implementations, the computing platform may utilize one or more data analytics operations that serve to analyze some set of metadata associated with the data file (which may comprise a portion of the stored metadata for the data file) and then predict which one or more workflows are most appropriate for the data file based on that analysis. Such a data analytics operation may take various forms. As one possibility, such a data analytics operation may be embodied in the form of a user-defined set of rules that is applied to a particular set of metadata for a data file to determine which one or more workflows to recommend for the data file. As another possibility, such a data analytics operation may be embodied in the form of a data science model that is applied to a particular set of metadata for the data file in order to determine which one or more workflows to recommend for the data file. And in either case, the one or more workflows that are recommended by the data analytics operation could either comprise a single workflow that is deemed to be most applicable for the data file or a set of multiple workflows that are each deemed to be sufficiently applicable for the data file, among other possibilities.

Further, the particular set of metadata that is analyzed to determine which one or more workflows to recommend for the data file may take any of various forms, examples of which may include a metadata field indicating the original and/or current name of the data file, a metadata field indicating the type of the data file, a metadata field indicating the originator of the data file, and/or a metadata field indicating the suitability status of the data file, among other possibilities. To illustrate with an example, a first data file having a "Status" of "S3," a "Type" of "Drawing," and an Originator of "X" may lead the computing platform to recommend a single workflow of "Review 1," whereas a second data file having a "Status" of "S4," a "Type" of "Drawing," and an Originator of "Y" may lead the computing platform to recommend multiple workflows of "Review 1" and "Review 2." Many other examples are possible as well.

In some implementations, after determining the one or more recommended workflows for the data file, the computing platform may then present the one or more recommended workflows to a user of the SaaS application in a manner that enables the user to select and/or confirm which particular workflow is to be assigned to the data file. In such implementations, the computing platform may function to transmit, to a client station associated with the user, a communication identifying the one or more recommended workflows and thereby cause a selectable indicator of each recommended workflow for the data file to be presented at a user interface of the client station, such that the user may, after reviewing the one or more recommended workflows, select a particular recommended workflow to assign to the data file (although it is also possible that the user could decline to select any recommended workflow). In such implementations, causing a selectable indicator of each recommended workflow for the data file to be presented at the user interface of the client station may help the user select an appropriate workflow to be assigned to the data file, and the computing platform may then assign a particular workflow to the data file based on the user's input.

In other implementations, after determining the one or more recommended workflows for the data file, the computing platform may function to automatically assign a given one of the one or more recommended workflows to the data file (e.g., by selecting and assigning the workflow deemed to be most appropriate for the data file). In such implementations, the computing platform may function to transmit, to a client station associated with a user of the SaaS application, a communication identifying the automatically-selected workflow and thereby cause an indication of the automatically-selected workflow for the data file to be presented at a user interface of the client station. In such implementations, causing an indication of the automatically-selected workflow for the data file to be presented at the user interface of the client station may serve as a notification to the user of which workflow has been assigned to the data file.

Further, in at least some implementations, the computing platform may also be configured such that, in response to assigning a particular workflow to the data file (e.g., based on the user's input or automatically), the computing platform may perform certain functions in order to automatically trigger or initiate the workflow assigned to the data file (e.g., by causing an email to be sent to an individual that is tasked with an action within the assigned workflow).

In addition to facilitating assignment of a first workflow (e.g., an initial workflow) in the manner described above, the computing platform may also be configured to facilitate assignment of one or more additional or updated workflows for the data file. Throughout a construction project, metadata associated with a data file may be updated, and the computing platform may obtain this updated metadata. The computing platform may then determine, based at least in part on the obtained updated metadata, one or more updated recommended workflows for assignment to the data file. As one particular example, during the construction project, metadata in a "Status" metadata field may change (e.g., the "Status" may change from "S3" (i.e., suitable for review & comment) to "S4" (i.e., suitable for stage approval)), and based on the updated status metadata, the computing platform may then determine one or more updated recommended workflows for the data file (e.g., recommending a change from a "Review" workflow to a "Final Approval" workflow). Many other examples are possible as well.

The computing platform may also be configured such that, after determining one or more updated recommended workflows for the data file, the computing platform may present the one or more updated recommended workflows to a user of the SaaS application in a manner that enables the user to select and/or confirm which particular workflow is to be assigned to the data file. In other implementations, after determining one or more updated recommended workflows for the data file, the computing platform may function to automatically assign a given one of the one or more updated recommended workflows to the data file (e.g., by selecting and assigning the updated workflow deemed to be most appropriate for the data file).

The software technology disclosed herein may provide various benefits over existing techniques for assigning workflows to data files. For instance, using a data-driven approach to recommend workflows for assignment to data files based on metadata associated with the data files may provide a more efficient and accurate assignment of workflows for data files than existing approaches for assigning workflows, which as noted above are primarily user-driven.

For instance, as noted above, the existing user-driven approaches require users to expend a substantial amount of time and effort evaluating which workflows should be assigned to data files (either through direct selection of the workflow itself or through selection of the folder for storing the data file). Advantageously, the disclosed data-driven approach for assigning workflows may help to significantly reduce this time and effort by providing users with metadata-based recommendations of which workflows should be assigned to data files. Given the large number of data files (which may be on the order of thousands, tens of thousands, hundreds of thousands, etc.) typically controlled and managed throughout a construction process, the disclosed technology may help to provide significantly reduced time and effort compared to existing approaches for assigning workflows.

Moreover, as noted above, the existing user-driven approaches are prone to user error, because the assignment of workflows is dictated entirely by user input (either in the form of user selection of the appropriate workflow for each data file or user selection of the appropriate folder for storing the data file). Advantageously, the disclosed data-driven approach for assigning workflows may help to significantly reduce this risk of user error by providing users with metadata-based recommendations of which workflows should be assigned to data files, which leads to assignments of workflows that are based at least on part of metadata for the data files rather than on user input alone. In this way, the disclosed data-driven approach may thus help to provide more accurate assignments of workflows for data files than existing user-driven approaches, which in turn may help to efficiently and effectively improve compliance with standards governing a construction project, such as ISO 19650, among other possibilities.

In accordance with the above, in one aspect, disclosed herein is a method that involves a computing platform: (i) receiving, from a first client station, a data file; (ii) obtaining metadata associated with the data file; (iii) determining, based on the obtained metadata, at least one recommended workflow for assignment to the data file, wherein the workflow defines a set of one or more actions that are to be taken in connection with the data file; and (iv) transmitting, to a second client station, a communication identifying the at least one recommended workflow and thereby causing an indication of the at least one recommended workflow for the data file to be presented at a user interface of the second client station.

In another aspect, disclosed herein is a computing system that includes at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium comprising program instructions that are executable to cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure generally relates to technology for assigning workflows to data files based on metadata associated with the data files. In practice, the disclosed technology may be incorporated into a software as a service ("SaaS") application that facilitates control and management of data files, which may include back-end software that runs on a back-end computing platform and front-end software that runs on users' client stations (e.g., in the form of a native application, a web application, and/or a hybrid application, etc.) and can be used to access the SaaS application via a data network, such as the Internet. For example, as one possible example, the disclosed technology may be incorporated into a SaaS application for construction management, such as the one offered by Procore Technologies, Inc. However, other examples are possible as well.

I. EXAMPLE SYSTEM CONFIGURATION

Figure 1:
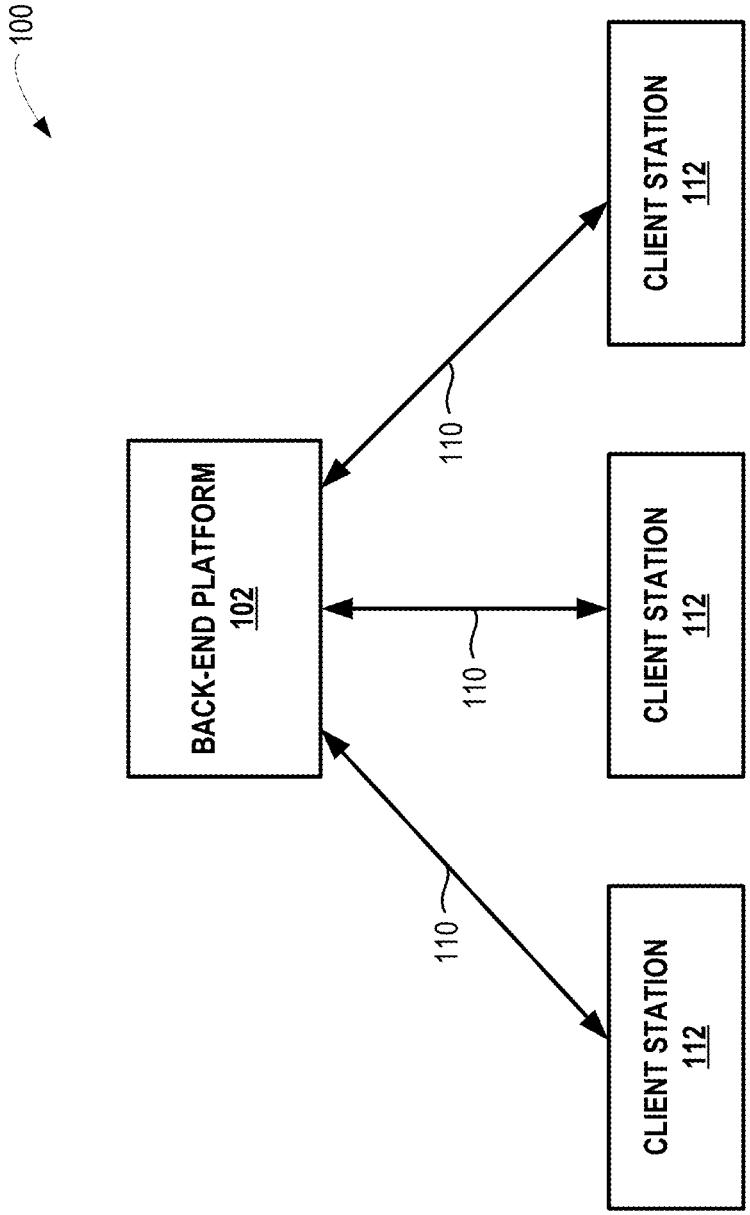
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been installed with back-end software (e.g., program code) for hosting an example SaaS application that incorporates the disclosed technology and delivering it to users over a data network. The one or more computing systems of back-end computing platform 102 may take various forms and be arranged in various manners.

For instance, as one possibility, back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like, which may be provisioned with software for carrying out one or more of the functions disclosed herein. As another possibility, back-end computing platform 102 may comprise "on-premises" computing resources of the organization that operates the example computing platform 102 (e.g., organization-owned servers), which may be provisioned with software for carrying out one or more of the functions disclosed herein. As yet another possibility, the example computing platform 102 may comprise a combination of cloud computing resources and on-premises computing resources. Other implementations of back-end computing platform 102 are possible as well.

In turn, client stations 112 may each be any computing device that is capable of accessing the SaaS application hosted by back-end computing platform 102. In this respect, client stations 112 may each include hardware components such as a processor, data storage, a communication interface, and user-interface components (or interfaces for connecting thereto), among other possible hardware components, as well as software components that facilitate the client station's ability to access the SaaS application hosted by back-end computing platform 102 and run the front-end software of the SaaS application (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three client stations are communicatively coupled to back-end computing platform 102, it should be understood that this is merely for purposes of illustration and that any number of client stations may communicate with back-end computing platform 102.

Although not shown in FIG. 1, back-end computing platform 102 may also be configured to interact with other third-party computing platforms, such as third-party computing platforms operated by organizations that have subscribed to the SaaS application and/or third-party computing platforms operated by organizations that provide back-end computing platform 102 with third-party data for use in the SaaS application. Such computing platforms, and the interaction between back-end computing platform 102 and such computing platforms, may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
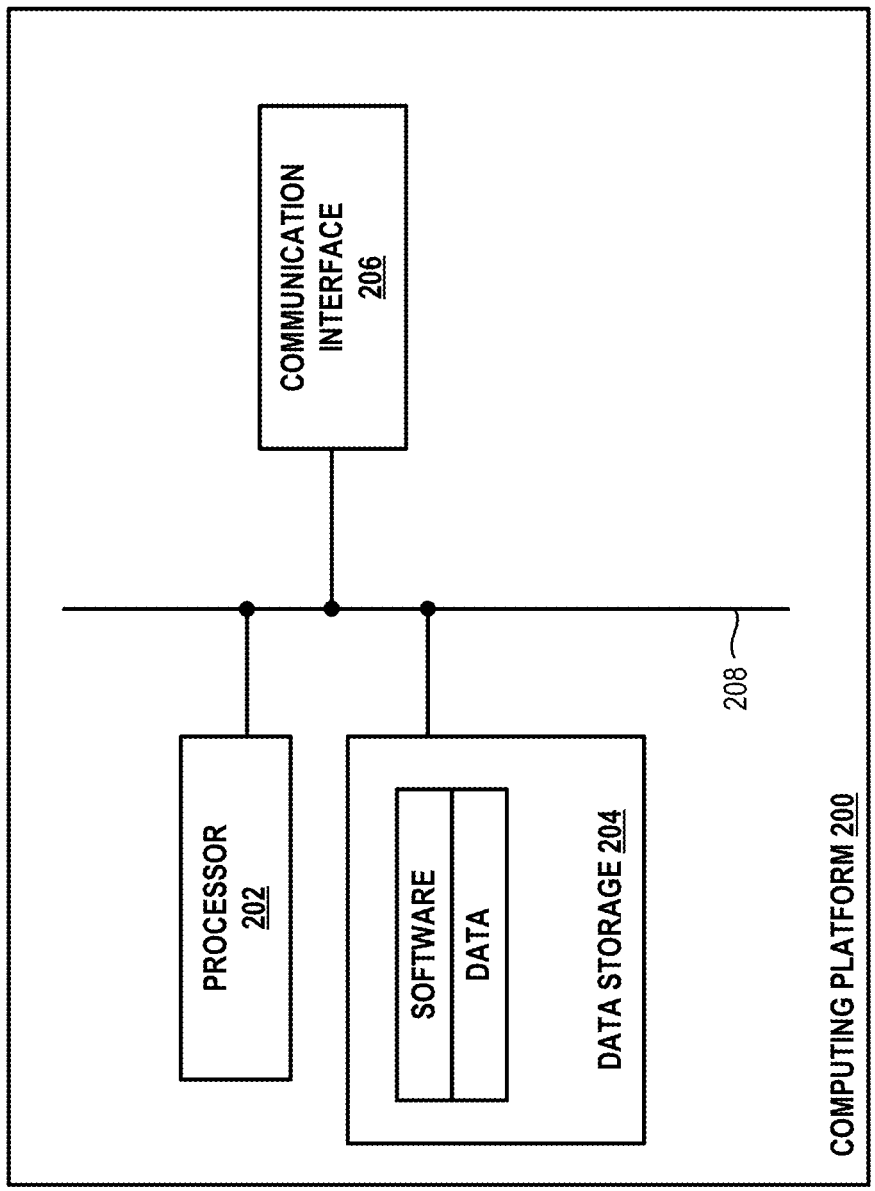
FIG. 2 depicts an example computing platform that may be configured to carry out one or more of the functions according to the disclosed technology.

FIG. 2 is a simplified block diagram illustrating some structural components that may be included in an example computing platform 200, which could serve as, for instance, back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions, which may be arranged together into engineering artifacts or the like, and (ii) data that may be received, derived, or otherwise stored by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, hard-disk drives, solid-state drives, flash memory, optical-storage devices, etc. Further, data storage 204 may utilize any of various types of data storage technologies to store data within the computing platform 200, examples of which may include relational databases, NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities. Further yet, in line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations (e.g., one or more client stations 112 of FIG. 1) and/or third-party computing platform. Additionally, in an implementation where computing platform 200 comprises a plurality of physical computing systems connected via a network, communication interface 206 may be configured to facilitate wireless and/or wired communication between these physical computing systems (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate any of various types of wireless communication (e.g., WiFi communication, cellular communication, etc.), and/or any other interface that provides for wireless and/or wired communication. Communication interface 206 may also include multiple communication interfaces of different types. Other configurations are possible as well.

Although not shown, computing platform 200 may additionally include or have an interface for connecting to user-interface components that facilitate user interaction with computing system 200, such as a keyboard, a mouse, a trackpad, a display screen, a touch-sensitive interface, a stylus, a virtual-reality headset, and/or speakers, among other possibilities.

It should be understood that computing platform 200 is one example of a computing system that may be used with the embodiments described herein. Numerous other arrangements are possible and contemplated herein. For instance, other computing systems may include additional components not pictured and/or more or fewer of the pictured components.

III. EXAMPLE OPERATIONS

As mentioned above, the present disclosure generally relates to technology for assigning workflows to data files based on metadata associated with the data files. As further mentioned above, the assignment of workflows to data files described herein can be carried out by a back-end computing platform, such as back-end computing platform 102 of FIG. 1, that is hosting a SaaS application comprising front-end software running on users' client stations and back-end software running on the back-end computing platform that is accessible to the client stations via a data network, such as the Internet. For instance, the disclosed technology is described below in the context of a SaaS application for construction management, such as the SaaS application offered by Procore Technologies, Inc., but it should be understood that the disclosed technology may be utilized to control and manage data files in various other contexts as well.

i. Obtaining and Storing Metadata for Data Files

In accordance with the disclosed technology, back-end computing platform 102 may be configured to receive data files, obtain metadata associated with such data files, and then store the obtained metadata for use in carrying out various functionality.

Back-end computing platform 102 may receive a data file from a client station in any suitable way. As one example, a user may upload a data file about a construction project through a client station running front-end software for a SaaS application. For instance, with reference to FIG. 1, a user of one of client stations 112 may upload the data file (perhaps along with other data files as well), and back-end computing platform 102 may then receive the uploaded data file (perhaps along with the other uploaded data files) from client station 112 over a data network such as the Internet.

As another example, a SaaS application may be configured such that a user may upload one or more data files by sending an email. For instance, a user of one of client stations 112 may send an email addressed to a platform administrator's email address, and the user may attach the one or more data files that the user wishes to upload. Back-end computing platform 102 may be configured to access the email having the attachments, so as to receive the one or more data files.

In yet another example, a SaaS application may be configured such that a user of one of client stations 112 may save one or more data files to a shared data store to which both client station 112 and back-end computing platform 102 have access. In turn, back-end computing platform 102 may retrieve files from the shared data store, and as such, saving the one or more data files on the shared drive may result in the one or more data files being received by back-end computing platform 102. Other examples of receiving the data files are possible as well.

Further, in general, any data files relevant to the construction project may be received by back-end computing platform 102 running the SaaS application for construction management. Example data files could include PDF files, JPEG files, DWG files, Building Information Model (BIM) files, and Computer-Aided Design (CAD) files (e.g., NWF files), among other possibilities.

After receiving data files in any of the manners described above, back-end computing platform 102 may store the data files for future access.

In addition to receiving data files, back-end computing platform 102 may also obtain metadata associated with received data files, which may generally comprise data that provides information about the data files. In practice, a data file may have metadata for any of various associated metadata fields, examples of which may include metadata fields that respectively contain information such as original and/or current file name, file type (e.g., drawing, specification, model, photo, etc.), description, suitability status (e.g., S1 (suitable for coordination), S2 (suitable for information), S3 (suitable for review & comment), S4 (suitable for stage approval), etc.), trade (e.g., electrical, plumbing, etc.), stage (e.g., preconstruction, design, bidding, construction, closeout, maintenance, etc.), classification (e.g., sub-type of document, such as elevation drawing, plan view drawing, etc.), volume/system (e.g., zone of project), location (e.g., building, level of building, etc.), originator (e.g., the individual or organization that uploaded the data file), original file format, file size, due date, revision, permissions, date created, date uploaded, storage zone (e.g., zone where the data is stored or to be stored), and/or current assignee. Other metadata is possible as well. Further, in at least some implementations, the particular metadata obtained for a given data file may depend on the particular construction project to which the data file is associated.

Further, the universe of metadata fields for which metadata may be obtained for a given data file may depend on any of various factors, examples of which may include the nature of the data files being evaluated (e.g., data files within a SaaS application for construction management versus data files within some other type of software application), the preferences of the SaaS application provider, the preferences of the user, and/or other factors that are specific to the type of SaaS application that incorporates the disclosed technology (e.g., in a SaaS application for construction management, the universe of metadata fields could depend on the specific construction project to which the data files are associated and/or the particular type of construction-related data files that are being evaluated). Other examples are possible as well.

Further yet, back-end computing platform 102 may obtain the metadata for a data file in various ways. In general, the obtained metadata for a data file may include metadata that has been received from one or more client stations and/or metadata generated by back-end computing platform 102. Further, the metadata that has been received from one or more client stations and the metadata generated by back-end computing platform 102 may be obtained in any suitable way, examples of which are described below.

Turning first to metadata that has been received from one or more client stations, back-end computing platform 102 may obtain metadata from the client station that uploaded the data file and/or a different client station. As one example, when uploading a data file using a client station, a user may enter certain types of information about the data file, and this information may thereafter be sent from the client station to back-end computing platform 102 in the form of metadata that is indicative of that information—which may then be received and stored by back-end computing platform 102. As another example, after a data file is received from a first client station, a user of a second, different client station may enter certain types of information about the data file, and this information may thereafter be sent from the second client station to back-end computing platform 102 in the form of metadata that is indicative of that information—which may then be received and stored by back-end computing platform 102. Other examples of obtaining metadata that has been received from one or more client stations are possible as well.

Turning next to metadata generated by back-end computing platform 102, the back-end computing platform may obtain such metadata. As one possibility, back-end computing platform 102 may automatically generate certain types of metadata based on the data file that is received. For example, a native data file being uploaded may itself comprise one or more metadata fields that are associated with the native data file (e.g., metadata generated by the application that created the data file), in which case back-end computing platform 102 may extract the native metadata for certain of these metadata fields and then store it as metadata for the data file that is accessible within the SaaS application. As another example, back-end computing platform 102 may perform an analysis on the data file (e.g., analysis using natural language processing (NLP) or other machine learning-based techniques), and generate certain types of metadata based on the computing-platform analysis that is then stored for the data file. Other examples of obtaining metadata (e.g., user-input metadata values and/or metadata values generated by platform) are possible as well.

After obtaining the metadata for a data file in any of the manners described above, back-end computing platform 102 may store the obtained metadata for future access. The obtained metadata may then be used by back-end computing platform 102 to drive various functionality for controlling and managing data files stored within back-end computing platform 102, as described in further detail below.

ii. Assignment of Workflows to Data Files

As noted above, the disclosed technology facilitates assignment of workflows to data files based on obtained metadata associated with the data files, which may help to facilitate compliance with standards governing construction projects (e.g., ISO 19650).

Figure 3:
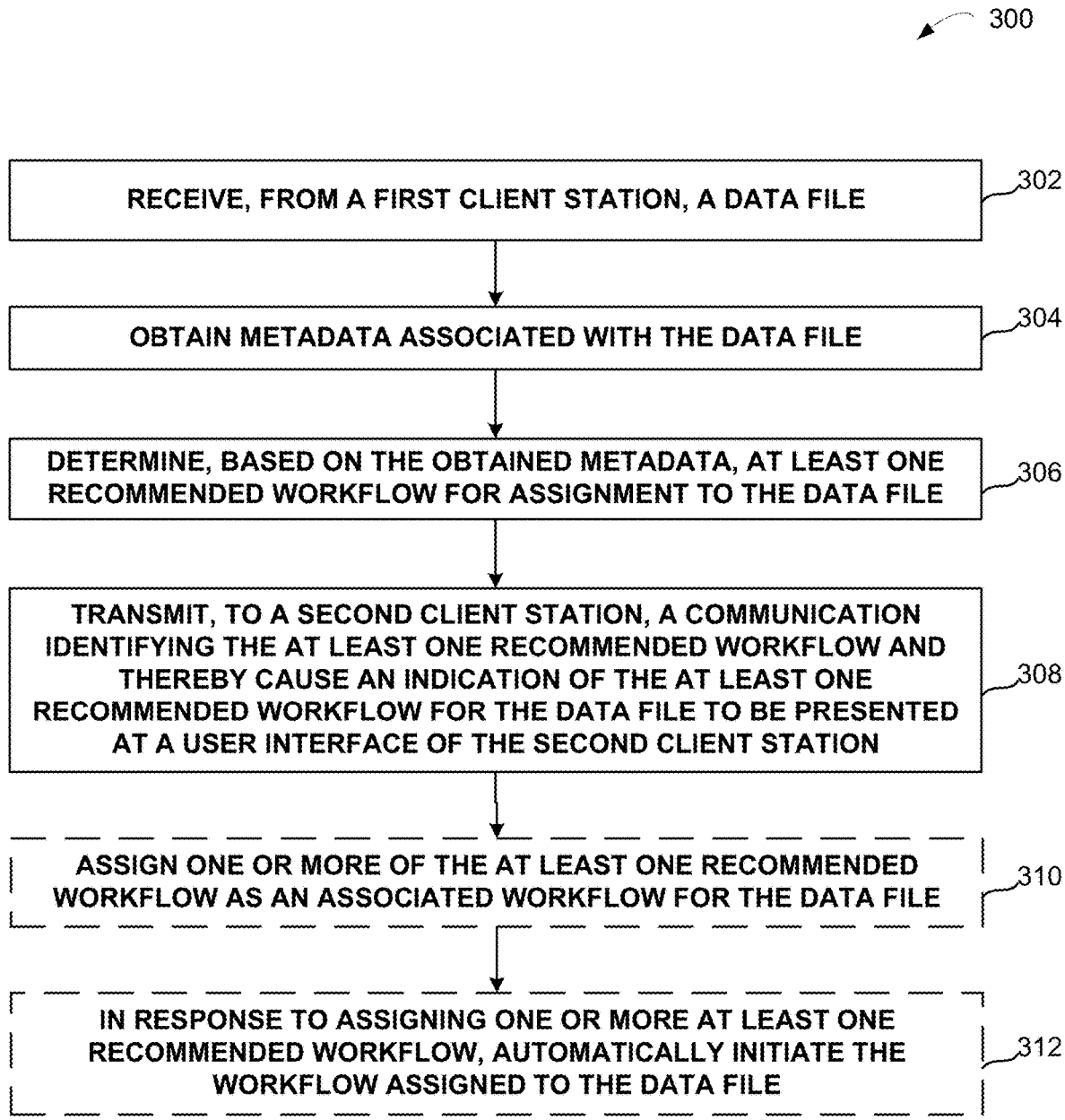
FIG. 3 depicts an example process for facilitating metadata-based assignment of workflows for data files according to the disclosed technology.

FIG. 3 depicts one example of a process 300 that may be carried out in accordance with the disclosed technology in order to facilitate metadata-based assignment of workflows to data files. For purposes of illustration only, example process 300 is described as being carried out by back-end computing platform 102 of FIG. 1, but it should be understood that example process 300 may be carried out by computing platforms that take other forms as well. Further, it should be understood that, in practice, the functions described with reference to FIG. 3 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

The example process 300 may begin at block 302, where back-end computing platform 102 receives, from a first client station, a data file. In this respect, the data file may take any of various forms, including but not limited to the forms described above, and back-end computing platform 102 may receive the data file from the first client station in any suitable way, including but not limited to any of the ways of receiving a data file described above.

In practice, the data file that is received from the first client station may be stored in a data store, and back-end computing platform 102 may access that data store as needed.

In addition to receiving the data file, at block 304, back-end computing platform 102 obtains metadata associated with the data file. In this respect, the obtained metadata associated with the data file may take any of various forms, including but not limited to the forms described above, and back-end computing platform 102 may obtain such metadata in any suitable way, including but not limited to any of the ways of obtaining metadata for a data file described above.

After obtaining the metadata, at block 306, back-end computing platform 102 determines, based on the obtained metadata, one or more recommended workflows for assignment to the data file. In accordance with the present disclosure, the workflows that may be recommended for assignment to the data files may be selected from some universe of predefined workflows that are available for assignment to data files stored within back-end computing platform 102. Such workflows may take any of various forms, and in at least some implementations, may be defined in accordance with a standard such as ISO 19650. As examples, the workflows that are available for assignment may comprise actions related to review of a data file, approval of a data file, revision of a data file, and/or other decisions related to a data file, among other possibilities. Further, in practice, the particular universe of workflows that are available for assignment to data files could be defined by the SaaS application provider, the users of the SaaS application, or some combination thereof. Further yet, the particular universe of workflows that are available for assignment to data files could vary based factors such as the specific construction project to which the data files are associated and/or the particular type of construction-related data files that are being evaluated, among other possibilities.

The particular set of metadata that is analyzed by back-end computing platform 102 to determine which one or more workflows to recommend for the data file may take any of various forms, examples of which may include a metadata field indicating the original and/or current name of the data file, a metadata field indicating the type of the data file, a metadata field indicating the originator of the data file, and/or a metadata field indicating the suitability status of the data file, among other possibilities. To illustrate with an example, a first data file having a "Status" of "S3," a "Type" of "Drawing," and an Originator of "X" may lead the computing platform to recommend a single workflow of "Review 1," whereas a second data file having a "Status" of "S4," a "Type" of "Drawing," and an Originator of "Y" may lead the computing platform to recommend multiple workflows of "Review 1" and "Review 2." Many other examples are possible as well.

Further, the function of determining the one or more recommended workflows for assignment to the data file based on the obtained metadata may take various forms, and in at least some implementations, back-end computing platform 102 may utilize one or more data analytics operations that serve to analyze some set of metadata associated with the data file (which may comprise a portion of the stored metadata for the data file) and then predict which one or more workflows are most appropriate for the data file based on that analysis. Such a data analytics operation may take various forms.

As one possibility, a data analytics operation carried out by back-end computing platform 102 to determine which one or more workflows to recommend may be embodied in the form of a user-defined set of rules that is applied to a particular set of metadata for a data file and outputs a determination of which one or more workflows to recommend for the data file. In general, any suitable rule(s) to determine which one or more workflows to recommend may be utilized. Further, in practice, the user-defined rules that are used to determine which one or more workflows to recommend could be defined by the SaaS application provider, the users of the SaaS application, or some combination thereof. Further yet, the user-defined rules that are used to determine which one or more workflows to recommend could vary based factors such as the specific construction project to which the data files are associated, the particular type of construction-related data files that are being evaluated, and/or the particular organization for which the data files are being stored, among other possibilities.

As an illustrative example of a user-defined set of rules, one rule may be that, if a data file has a file type of "drawing" and a status of "S3," the recommended workflow is "Upload and Create." Another rule may be that, if a data file has a file type of "drawing" and a status of "S4" or greater, the recommended workflows are "Project Manager Review," "Executive Review," "Custom Workflow 1," or "Custom Workflow 2." Additionally, the set of rules may also be defined to take into account additional metadata, which may help to further narrow down the suitable workflows for a given data file. For instance, yet another rule may be that, if a data file has an Originator of "Organization 1," the recommended workflows are "Project Manager Review" and "Custom Workflow 1," but if a data file has an Originator of "Organization 2," the recommended workflows are "Executive Review" and "Custom Workflow 2." By applying this example set of rules, back-end computing platform 102 may determine that, for a data file having a file type of "drawing," a status of "S4" or greater, and an Originator of "Organization 1," the recommended workflows are "Project Manager Review" and "Custom Workflow 1," but for a data file having a file type of "drawing," a status of "S4" or greater, and an Originator of "Organization 2," the recommended workflows are "Executive Review" and "Custom Workflow 2." The entire set of recommended workflows determined in this manner may then be selected as the one or more recommended workflows for the data file, or alternatively, back-end computing platform 102 may apply some additional logic to set of recommended workflows in order to select a subset of the recommended workflows (e.g., one particular recommended workflow) to use as the one or more recommended workflows for the data file. Many other examples of user-defined sets of rules are possible as well.

As another possibility, a data analytics operation carried out by back-end computing platform 102 to determine which one or more workflows to recommend may be embodied in the form of a data science model that receives a particular set of metadata for a data file as input and then outputs a determination of which one or more workflows to recommend for the data file.

Figure 4:
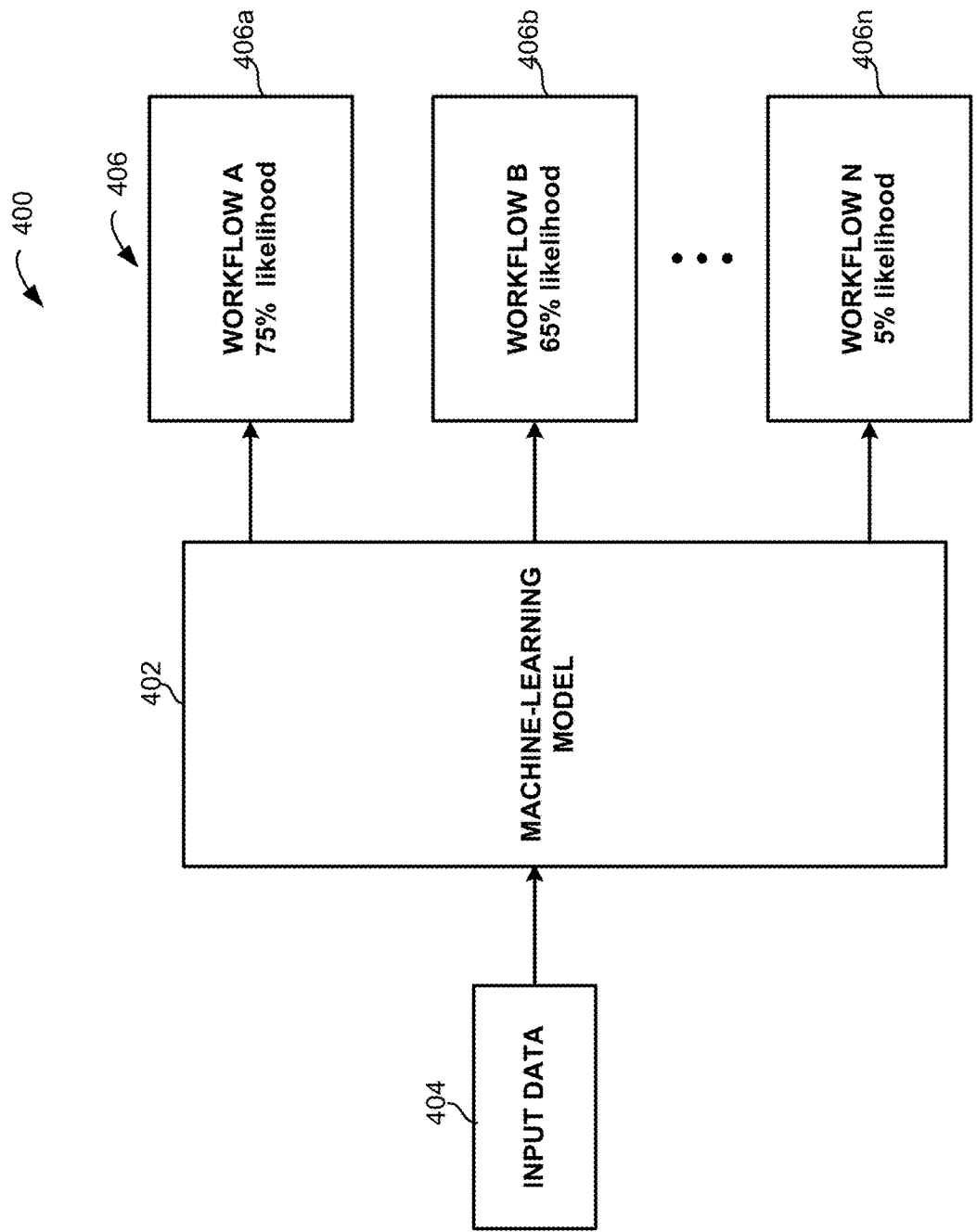
FIG. 4 depicts a conceptual illustration of an example data science model that is configured determine a recommended workflow(s) for a data file.

FIG. 4 depicts a conceptual illustration of one example of such a data science model 400 that is configured to determine the recommended workflow(s) for a data file. In the example of FIG. 4, the data science model may take the form of a machine-learning model 402, such as a classifier model, which has been trained based on historical data regarding workflow assignments using any one or more machine learning techniques now known or later developed, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques.

Machine-learning model 402 may be configured to receive input data 404. The input data may comprise the obtained metadata associated with the data file. In an example, input data 404 includes all of the metadata associated with the data file. In another example, input data 404 includes a portion of the metadata associated with the data file. For instance, in practice, certain categories of metadata may have more influence or weight (compared to other categories) with respect to determining which of the available workflows be carried out with respect to a data file, in which case machine-learning model 402 may be configured to receive and evaluate only a subset of the metadata for a data file.

Machine-learning model 402 is configured to evaluate input data 404 and, based on the evaluation, render predictions regarding the applicability or suitability of different workflow options that are represented in the form of output data 406. In an example, the output data 406 may comprise a respective likelihood value (or the like) for each of the potential workflow options in the universe of workflows that are available for assignment to data files, which provides a measure of how likely it is that a potential workflow option should be assigned to the data file (i.e., a measure of how applicable or suitable the potential workflow option is predicted be for the data file). For instance, machine-learning model 402 may be configured to predict a likelihood value for each of N potential workflow options. As illustrated in FIG. 4, output data 406 of machine-learning model 402 includes a first likelihood value 406*a* for workflow A (which indicates in this example that workflow A has a 75% chance likelihood of being an appropriate workflow for the data file), likelihood value 406*b* for workflow B (which indicates in this example that workflow B has a 65% chance likelihood of being an appropriate workflow for the data file), and likelihood value 406*n* for workflow N (which indicates in this example that workflow N has a 5% chance likelihood of being an appropriate workflow for the data file).

Although not shown, in an example, the data science model 400 may also include a post-processing operation that functions to interpret output data 406 of the machine-learning model 402 so as to determine which workflow(s), if any, to recommend for the data file. Such a post-processing operation may take various forms.

As one possibility, an example post-processing operation for the data science model 400 may function to select whichever workflow that has the highest likelihood value as the lone recommended workflow for the data file. For instance, with reference to FIG. 4, this example post-processing operation may function to select the workflow A as the lone recommended workflow for the data file.

As another possibility, an example post-processing operation for the data science model 400 may function to select any workflow(s) having a likelihood value that exceeds a threshold value as a recommended workflow for the data. The threshold value may be any suitable threshold, such as any threshold percentage likelihood of at least 50%. With reference to FIG. 4, if an example threshold value of 60% is used, this example post-processing operation may function to select both workflow A and workflow B as recommended workflows.

As yet another possibility, an example post-processing operation for the data science model 400 may function to (i) select whichever workflow that has the highest likelihood as the lone recommended workflow for the data file, so long as the likelihood value exceeds a threshold value, and (ii) if there are no workflows having a likelihood value that exceeds the threshold value, do not select any workflows that are to be recommended for the data file (in which case either the data file will not be assigned any workflow or the data file may be assigned a workflow based solely on user input and not any recommendation by the computing platform 102). With reference to FIG. 4, this example post-processing operation may select workflow A as the recommended workflow if the an example threshold value of 70% is used, whereas this example post-processing operation may not select any workflow if the an example threshold value of 80% is used. Other example post-processing rules are possible as well.

As mentioned above, in either case of a data analytics operation embodied in the form of a user-defined set of rules or a data analytics operation embodied in the form of a data science model, the one or more workflows that are recommended by the data analytics operation could either comprise a single workflow that is deemed to be most applicable for the data file or a set of multiple workflows that are each deemed to be sufficiently applicable for the data file, among other possibilities.

Returning to FIG. 3, at block 308, back-end computing platform 102 transmits, to a second client station, a communication identifying the one or more recommended workflows for the data file and thereby causes an indication of the one or more recommended workflows for the data file to be presented at a user interface of the second client station. In some examples, the first client station and the second client station are the same client station. Thus, the indication of the one or more recommended workflows for the data file may be presented at the same client station from which the data file was received. On the other hand, in other examples, the first client station and the second client station are different client stations. As one possibility, the first client station and the second client station may be different client stations associated with the same user. For instance, the first client station may be a computer of the user, and the second client station may be a phone of the user. As another possibility, the first client station may be a client station of a first user, and the second client station may be a client station of a different, second user. For instance, the first client station may be a client station used by a user to email the data file to a platform administrator, and the second client station may be a client station of the platform administrator. Other examples are possible as well.

The indication presented at the user interface of the second client station may take various forms. In general, the indication comprises one or more indicators that each identify a respective recommended workflow of the one or more recommended workflows. Each of the one or more indicators may comprise a label that identifies a respective recommended workflow, such as a text label. Further, in some cases, the one or more indicators may each be a selectable indicator, such that, for each selectable indicator, a user of the platform may, after reviewing the respective recommended workflow associated with the selectable indicator, select the respective recommended workflow to assign to the data file.

In an example, the indication of the one or more recommended workflows may comprise a an indicator for one given recommended workflow. In one example of such an indication, the one or more recommended workflows may be a lone recommended workflow, and the given recommended workflow may be the lone recommended workflow. In another example of such an indication, the one or more recommended workflows may comprise a plurality of recommended workflows, and the given recommended workflow may be whichever of the recommended workflows is considered to be the "preferred" recommended workflow for the data file (e.g., (e.g., the recommended workflow having the highest likelihood value).

Additionally, in line with the discussion above, the indicator for the one given recommended workflow may be a selectable indicator. As one example, the selectable indicator may comprise a text label that identifies the given recommended workflow, and that text label may itself be selectable in the sense that the user can click on the text label to control the selection of the given recommended workflow—although it should be understood that the given recommended workflow may initially be selected by default (as indicated by the fact that it is the workflow displayed to the user0 and need not be affirmatively selected by the user. As another example, along with the text label, the selectable indicator may comprise a first type of graphical user interface (GUI) element that allows a user to select the given recommended workflow as a workflow to assign to the data file (e.g., a selection button or box). In such an example, a user may interact with the first type of GUI element (e.g., by checking a selection box) in order to select the given recommended workflow for assignment to the data file—although it should be understood that the selection element could also be enabled by default for the given recommended workflow, in which case the user would not even have to affirmatively select the given recommended workflow. In addition to or alternative to including a selection element, the selectable indicator may comprise a second type of GUI element that allows a user to dismiss the given recommended workflow as an option for assignment to the data file (e.g., a delete button. Other examples of selectable indicators are possible as well.

In an example, in addition to the client station presenting a selectable indicator for this one given recommended workflow, the client station may further present a respective selectable indicator for each of one or more additional workflows. The one or more additional workflows may include one or more other recommended workflows for the data file and/or one or more workflows that are not recommended but are nevertheless available for assignment to the data file. Presenting respective selectable indicators for each of one or more additional workflows may be useful in a situation where there are multiple recommended workflows and/or there are one or more other workflows that a user may wish to consider for assignment to the data file despite not being recommended. In such a case, back-end computing platform 102 could the client station to present all of the selectable indicators as part of the initial indication that is that is displayed, although it may be desired to not present all the potential workflow options as part of the initial indication (e.g., for aesthetic purposes), so in some implementations, back-end computing platform 102 may instead enable the client station to presenting the additional indicators after it presents the initial indication. For example, back-end computing platform 102 may enable the client station to present additional indicators for the additional workflows in response to a user activating a button to review the additional indicators beyond the one for the one given recommend workflow, among other possibilities.

At block 310, back-end computing platform 102 may assign at least one of the one or more recommended workflows as an associated workflow for the data file. In an example, the assignment may take place in response to a user inputting a request to assign a selected workflow, which is relayed from the client station to back-end computing platform 102, and then back-end computing platform 102 assigns the workflow based on that communication from the client station. For instance, a user may activate a submit button, that activation is relayed from the client station to back-end computing platform 102, and then back-end computing platform 102 assigns the selected workflow to the data file.

In another example, back-end computing platform 102 may function to automatically assign at least one of the one or more recommended workflows to the data file (e.g., by selecting and assigning the workflow deemed to be most appropriate for the data file). In such implementations, the computing platform may function to transmit, to the second client station, a communication identifying the automatically-selected workflow and thereby cause an indication of the automatically-selected workflow for the data file to be presented at a user interface of the second client station. In such implementations, causing an indication of the automatically-selected workflow for the data file to be presented at the user interface of the second client station may serve as a notification to the user of which workflow has been assigned to the data file.

In an example, if the one or more recommended workflows comprises two or more recommended workflows, assigning at least one of the one or more recommended workflows as an associated workflow for the data file may comprise associating a given one of the two or more recommended workflows with the data file (whereas the other workflow(s) of the two or more recommended workflows are not assigned as an associated workflow(s)).

In another example, if the one or more recommended workflows comprises two or more recommended workflows, assigning at least one of the one or more recommended workflows as an associated workflow for the data file may comprise associating the two or more recommended workflows with the data file. For instance, in some cases, two or more workflows may be performed concurrently, such as in a situation where the workflows involve a review of the same data file by two different or organizations and are not required to be performed in a sequential fashion.

At block 312, back-end computing platform 102, in response to assigning at least one of the one or more recommended workflows, may automatically initiate the workflow assigned to the data file. Back-end computing platform 102 may initiate the workflow in various ways. As one possibility, back-end computing platform 102 may generate and send a communication (e.g., an email) to an individual responsible for performing the first action of the workflow. As an example, back-end computing platform 102 may generate and send an email to the individual responsible for performing the first action of the workflow. As another possibility, back-end computing platform 102 may initiate sending of a text message to the individual. As yet another possibility, back-end computing platform 102 may initiate an automated phone call to the individual, where the automated phone call delivers a pre-recorded voice message that serves to alert the individual of the first action of the workflow. Other examples are possible as well One illustrative example of how these various functions performed by back-end computing platform 102 may facilitate assignment of a workflow to a data file will now be shown and described with respect to FIGS. 5*a*-*b* and 6*a*-*c*, which comprise snapshots of GUI that may be presented by a given client station 112.

Figure 5A:
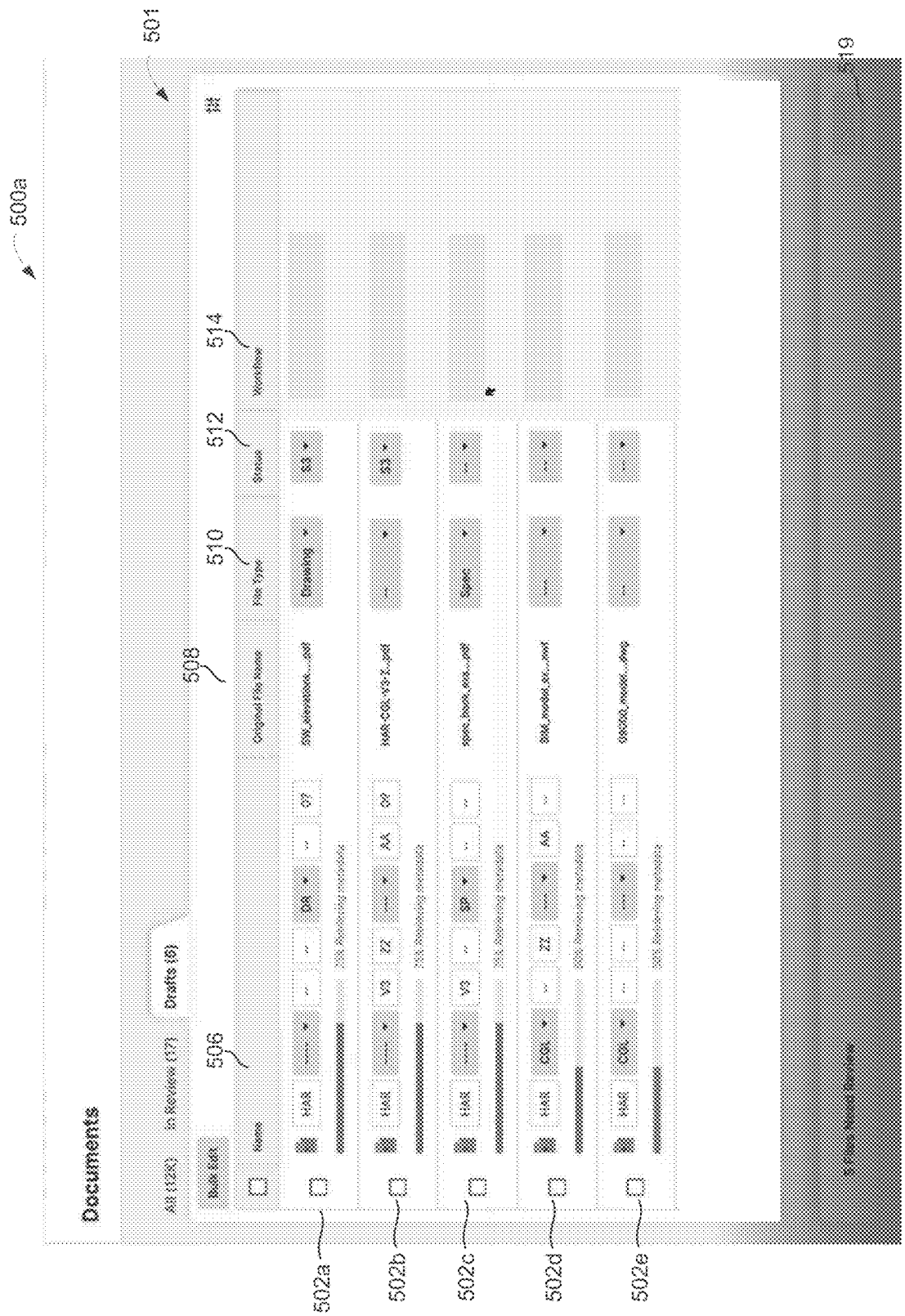
FIGS. 5a-b depict example snapshots of a graphical user interface (GUI) that may be presented to a user according to the disclosed technology.
Figure 5B:
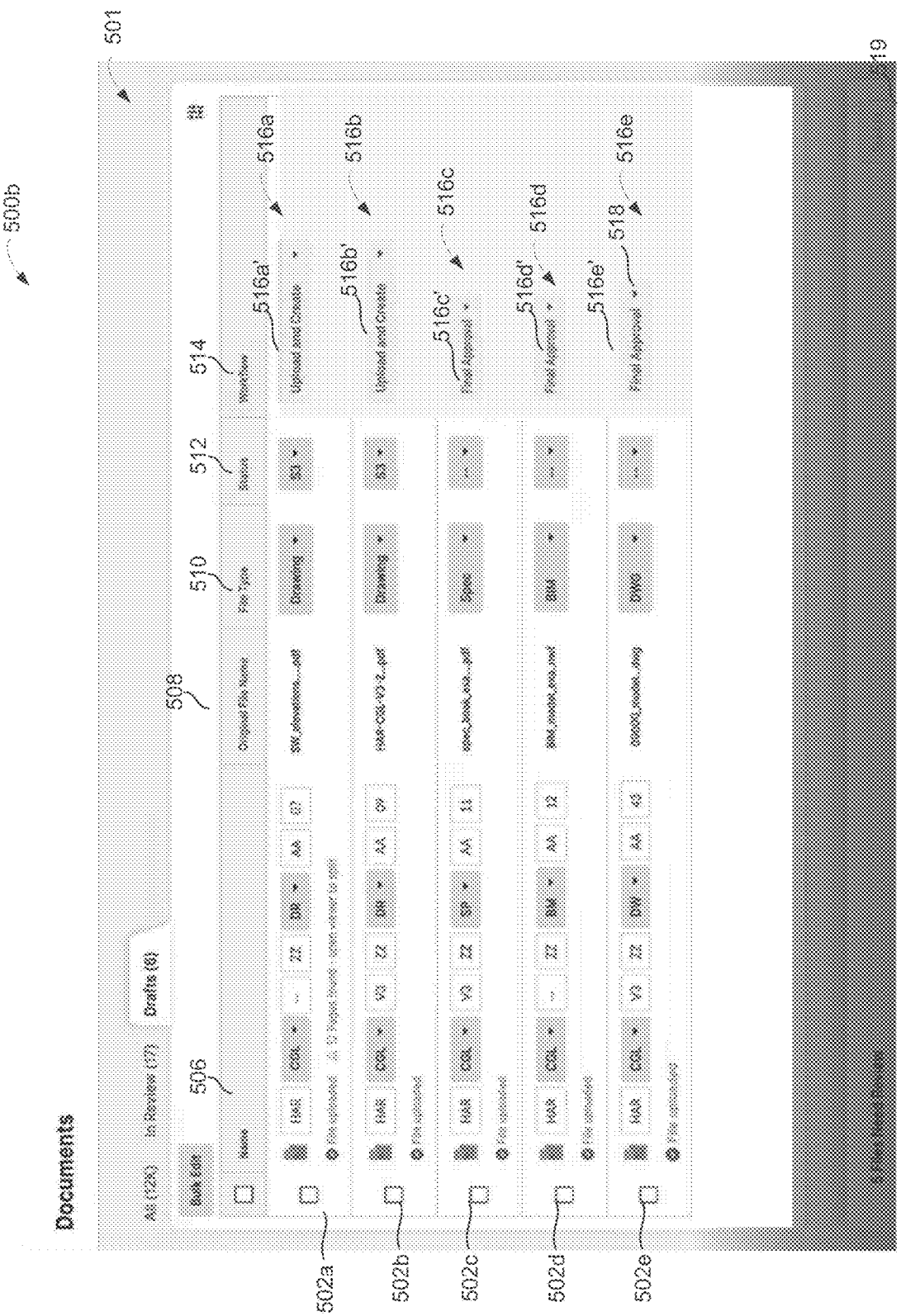

For instance, FIGS. 5*a* and 5*b* depict example snapshots 500*a* and 500*b*, respectively, of a GUI 501 that displays information during a process of a user uploading data files, back-end computing platform 102 obtaining metadata associated with the data files, and back-end computing platform 102 then determining recommended workflows for the data files that are to be presented to the user. In particular, snapshot 500*a* of FIG. 5*a* presents GUI 501 at a first instance or point in time (e.g., as data files are being uploaded and metadata is being generated by back-end computing platform 102). Further, snapshot 500*b* presents GUI 501 at a second point in time (e.g., after data files are uploaded) and through which a user can enter information or modify metadata associated with the data files, so as to facilitate back-end computing platform 102 receiving metadata from client station 112.

With reference to FIG. 5*a*, snapshot 500*a* is an example snapshot of the illustrated GUI 501 that may be presented to a user as data files 502*a*-*e* are being uploaded. As the data files are being uploaded, GUI 501 may display various metadata associated with the data files. For instance, metadata fields for file name, original file name, file type, status, and workflow are displayed. In particular, GUI 501 includes a name column 506, an original file name column 508, a file type column 510, a status column 512, and a workflow column 514.

At the instance shown in FIG. 5*a*, GUI 501 is displaying metadata for original file name for data files 502*a*-*e*. Further, GUI 501 is displaying file-type metadata for data files 502*a* and 502*c*. Still further, the GUI 501 is displaying status metadata for data files 502*a* and 502*b*. In an example, this displayed metadata shown in GUI 501 corresponds to metadata generated by back-end computing platform 102. Further yet, in order to facilitate GUI 501 displaying this status metadata, back-end computing platform 102 may send one or more communications to client station 112 that cause indications of the generated metadata to be presented at GUI 501, as shown in FIG. 5*a*.

Turning to FIG. 5*b*, after data files 502*a*-*e* are uploaded, back-end computing platform 102 may obtain additional metadata. For instance, with reference to FIG. 5*b*, the file type metadata for data files 502*b*, 502*d*, and 502*e* is now displayed. In an example, this file-type metadata may have been generated by back-end computing platform 102 as the uploads of data files 502*a*-*e* were being completed. Alternatively, in another example, this file-type metadata may have been obtained by the user entering information about the file type via GUI 501, and this information may thereafter be sent from client station 112 to back-end computing platform 102 in the form of metadata that is indicative of that information—which may then be received and stored by back-end computing platform 102.

Further, as shown in FIG. 5*b*, the status metadata for data files 502*c*-*e* is blank. In an example, back-end computing platform 102 may have been unable to identity appropriate status information, and thus back-end computing platform 102 may have refrained from automatically generating status metadata for that field. In such a case, for each of these files, this user may enter status information via GUI 501, and this status information may thereafter be sent from client station 112 to back-end computing platform 102 in the form of status metadata that is indicative of that status information—which may then be received and stored by back-end computing platform 102.

It should be understood that, in addition to obtaining metadata that is displayed by GUI 501, back-end computing platform 102 may also obtain metadata that is not displayed by GUI 501. For instance, in addition to obtaining original-file-name metadata, file-type metadata, and status metadata, back-end computing platform 102 may obtain description metadata, version metadata, trade metadata, classification metadata, zone metadata, location-of-data-file metadata, originator metadata, format metadata, revisions metadata, and/or permissions metadata, among other possibilities. Further, in practice, the metadata that is displayed by GUI 501 may be adjusted as desired. For instance, in an example, a user may select to have additional metadata columns displayed, such as version, due date, and/or originator, among other possibilities.

As further shown in FIG. 5*b*, for each data file displayed, GUI 501 includes an indication of the one or more recommended workflows for the data file. In particular, for data file 502*a*, GUI 501 includes an indication 516*a* of the one or more recommended workflows for data file 502*a*, where the indication comprises an indicator 516*a*' that identifies one given recommended workflow for data file 502. Further, for data file 502*b*, GUI 501 includes an indication 516*b* of the one or more recommended workflows for data file 502*b*, where the indication comprises an indicator 516*b*' that identifies one given recommended workflow for data file 502*b*. Still further, for data file 502*c*, GUI 501 includes an indication 516*c* of the one or more recommended workflows for data file 502*c*, where the indication comprises an indicator 516*c*' that identifies one given recommended workflow for data file 502*c*. Yet still further, for data file 502*d*, GUI 501 includes an indication 516*d* of the one or more recommended workflows for data file 502*d*, where the indication comprises an indicator 516*d*' that identifies one given recommended workflow for data file 502*d*. And yet still further, for data file 502*e*, GUI 501 includes an indication 516*e* of the one or more recommended workflows for data file 502*e*, where the indication comprises indicator an 516*e*' that identifies one given recommended workflow for data file 502*e*.

Notably, in snapshot 500*b* shown in FIG. 5*b*, indications 516*a*-*e* are each illustrated as displaying a selectable indicator for one given recommended workflow of the one or more recommended workflows. However, indications 516*a*-*e* each comprise a button (e.g., button 518 for indicator 516*e*), which a user may activate to reveal a respective indicator for each of one or more additional workflows.

As discussed above, the one or more additional workflows may include one or more other recommended workflows and/or one or more workflows that are not recommended but are nevertheless available for assignment to the data file. As an illustrative example of where the additional indicators are limited to only other recommended workflows, FIG. 6*a* depicts indication 516*e* having button 518 activated, which in turn results in displaying indicators for two additional recommended workflows. In particular, in this example, when button 518 of indication 516*e* is activated, GUI 501 would present three selectable indicators: 516*e*' (Final Approval) (which was originally shown), 516*e*'' (Project Manager Review), and 516*e*''' (Executive Review).

Figure 6B:
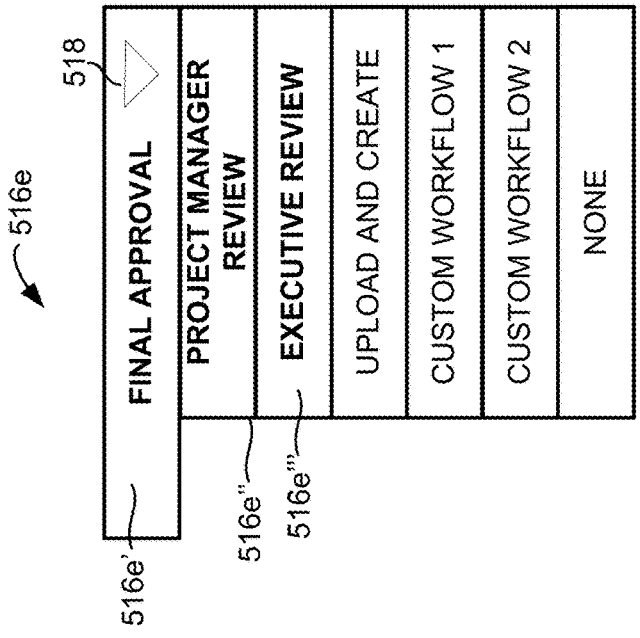
FIGS. 6a-c depict example selectable indicators that may be presented at a user interface of a client station.
Figure 6A:
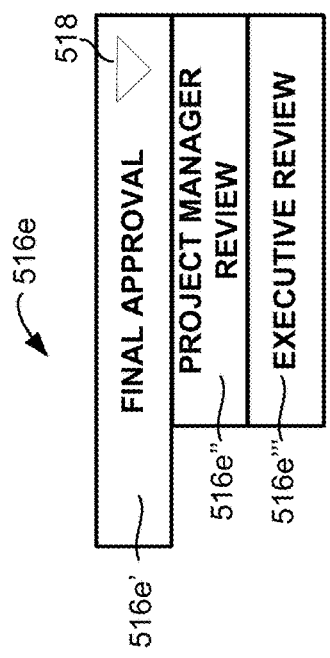

As an illustrative example of where the additional indicators include both one or more other recommended workflows and one or more workflows that are not recommended but available for selection, FIG. 6*b* illustrates an alternative indication 516*e* having button 518 activated, which in turn results in displaying indicators for two additional recommended workflows and one or more workflows that are not recommended but are available for assignment to the data file. In an example, back-end computing platform 102 may flag each of the recommended workflows so as to indicate that they are the recommended workflows. For instance, in an example, the universe of available workflows may be seven total available workflows, and GUI 501 may present indicators for all seven options (e.g., when button 518 is activated). The recommended workflows may be flagged in any suitable way, such as by bolding the recommended workflows, starring the recommended workflows, or highlighting the recommended workflows, among other possibilities. For instance, in the example of FIG. 6*b*, indicators 516*e*', 516*e*", and 516*e*'" have labels with bolded text, whereas the indicators 522 for the non-recommended workflows have labels where the text is not bolded. However, each of the indicators may be selectable such that any workflow from the universe of available workflows may be selected by the user.

Figure 6C:
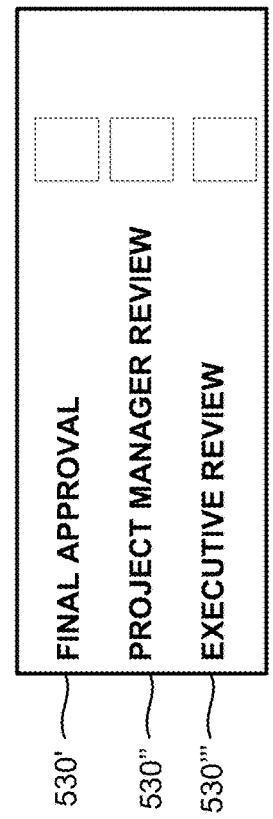

In the example of FIG. 5*b*, each indication 516*a-e* is depicted as including an indicator for one given recommended workflow in the first instance. However, rather than presenting an indication that includes an indicator for one given recommended workflow in the first instance, and thereafter presenting additional indicators (e.g., upon a user activation of button 518), in some examples the initial indication of the one or more recommended workflows may comprise a plurality of indicators that each identify a respective recommended workflow of the one or more recommended workflows. For instance, the indication may comprise a plurality of labels (e.g., text labels) that each identify a respective recommended workflow. Further, for each label, there may be a respective GUI element next to the label that allows a user to select the recommended workflow associated with the respective GUI element (e.g., a selection box or button). As an illustrative example, FIG. 6*c* depicts an indication 530 that comprises selectable indicators 530', 530", and 530'", each of the selectable indicators being a selectable indicator of a different one of the one or more recommended workflows.

Further, as discussed above, back-end computing platform 102 may assign at least one of the one or more recommended workflows as an associated workflow for the data file, and the assignment may take place in response to a user confirming which recommended workflow should be assigned as an associated workflow for the data file. For instance, with reference to FIG. 5*b*, a user may activate submit button 519, which may cause back-end computing platform 102 to assign the five selected workflows to data files 502*a-e*.

Further yet, as discussed above, if the one or more recommended workflows comprises two or more recommended workflows, assigning at least one of the one or more recommended workflows as an associated workflow for the data file may comprise associating a given one of the two or more recommended workflows with the data file. For instance, with respect to FIGS. 5*b* and 6*a*, for data file 502*e*, the data file had three recommended workflows (i.e., Final Approval, Project Manager Review, and Executive Review). In an example, the user may select the Final Approval workflow, and after a user presses submit button 519, the Final Approval workflow may be assigned as an associated workflow for data file 502*e* (whereas the Project Manager Review workflow and the Executive Review workflow are not assigned as associated workflows for data file 502*e*).

Still further, as discussed above, back-end computing platform 102, in response to assigning at least one of the one or more recommended workflows, may automatically initiate the workflow assigned to the data file, such as by generating and sending an email to the individual responsible for performing the first action of the workflow. For instance, with reference to FIGS. 5*b* and 6*a*, and in particular to data file 502*e*, Final Approval workflow for data file 502*e* may involve an approval path a Reviewer 1 followed by Reviewer 2 followed by Reviewer 3. In such an approval path, back-end computing platform 102 may generate and send an email to Reviewer 1. The email may include information about the data file, the action required, and the due date of the action, among other possibilities. As other possibilities, back-end computing platform 102 may initiate the sending of another type of communication, such as an autogenerated text message or phone call. Other examples are possible as well.

As mentioned above, in addition to facilitating assignment of a first workflow for the data file (e.g., an initial workflow), back-end computing platform 102 may also be configured to facilitate assignment of additional or updated workflows for the data file. The assignment of additional or updated workflows may be based on obtained metadata associated with the data file and, in particular, based on updated metadata obtained by back-end computing platform 102.

Figure 7:
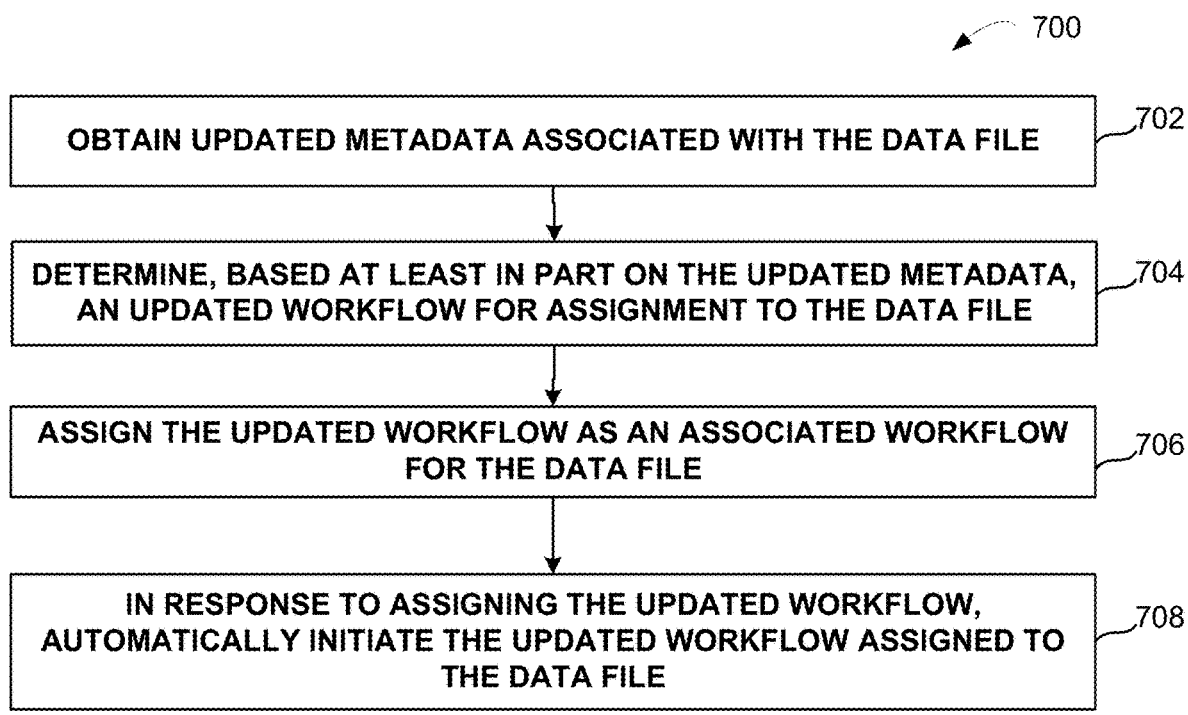
FIG. 7 depicts an example process for controlling and managing assignment of an updated workflow for a data file.

FIG. 7 illustrates one possible example of a process 700 that may be carried out in accordance with the disclosed technology to facilitate the assignment of an updated workflow to a data file. For purposes of illustration only, example process 700 is described as being carried out by back-end computing platform 102 of FIG. 1, but it should be understood that example process 700 may be carried out by computing platforms that take other forms as well. Further, it should be understood that, in practice, the functions described with reference to FIG. 7 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment. Further yet, in an example, process 700 may be carried out after process 300 takes place.

The example process 700 may begin at block 702, where back-end computing platform 102 obtains updated metadata associated with the data file. Throughout a construction project, metadata associated with a data file may be updated at various times, and back-end computing platform 102 may obtain this updated metadata. Further, the updated metadata may be obtained in various ways. In this respect, block 702 is similar in many respects to block 304, and thus is not described in as great of detail. It should be understood, however, that many of the possibilities and permutations described with respect to block 304 are also possible with respect to block 702.

Similar to the obtained metadata discussed with respect to FIG. 3, the obtained updated metadata may comprise metadata received from one or more client stations and/or metadata generated by back-end computing platform 102. One example of metadata being updated is that the status of the data file may change after a given workflow is complete, and as a result the status metadata may be updated. For instance, with reference to FIG. 5b, data file 502a has an associated status of S3. After undergoing the appropriate workflow for data file 502a, the metadata in a "Status" metadata field may be updated from S3 to S4.

At block 704, back-end computing platform 102 determines, based at least in part on the updated metadata, an updated workflow that is recommended for assignment to the data file. This determination may be made in various ways. Block 704 is similar in many respects to block 306, and thus is not described in as great of detail. It should be understood, however, that many of the possibilities and permutations described with respect to block 306 are also possible with respect to block 704.

As one particular example, with reference once again to FIG. 5b, during the construction project, metadata in a "Status" metadata field may change (e.g., the "Status" may change from S3 to S4), and, based on the updated "Status," back-end computing platform 102 may determine an updated recommended workflow for the data file (e.g., recommending a change from "Upload and Create" to "Custom Workflow 1").

At block 706, back-end computing platform 102 assigns the updated workflow as an associated workflow for the data file. Similar to the examples discussed above with respect to block 310 of FIG. 3, back-end computing platform 102 may assign the updated workflow as an associated workflow either automatically based on user input.

At block 708, back-end computing platform 102 may, in response to assigning the updated workflow, automatically initiate the updated workflow assigned to the data file. Similar to the example above with respect to block 312 of FIG. 3, back-end computing platform 102 may initiate the sending of a communication, such as an autogenerated email, text message, or phone call.

In the example of FIG. 7, the updated workflow may be determined for the same version of the data file upon which a first workflow (e.g., an original workflow) was performed. For instance, this may occur in a situation where completion of a workflow may result in a change of the metadata of the data file without any changes to the data file itself. In such a situation, if a subsequent workflow for that data file is appropriate, the subsequent workflow may then be applied to the same version of the data file. In other examples, however, completion of workflows may lead to new, revised versions of data files. For instance, completion of a given workflow (e.g., a revise-and-resubmit workflow) may involve a user revising a data file and uploading the revised version of the data file to complete a workflow. If a subsequent workflow is appropriate for the data file, the subsequent workflow may then be applied to the revised version of the data file.

As a particular example, completion of a workflow may result in back-end computing platform 102 receiving a revised version of a data file. Back-end computing platform 102 may obtain metadata for the revised version of the data file. The metadata may be obtained in the ways discussed above. Further, in an example, back-end computing platform 102 generates metadata for the revised version of the data file based on metadata stored for the previous revision of the data file. Based on the obtained metadata for the revised version of the data file, the back-end computing platform 102 may determine a recommended updated workflow that is recommended for assignment to the revised version of the data file. After determining a recommended updated workflow for assignment to the revised version of the data file, back-end computing platform 102 may assign the updated workflow as an associated workflow for the revised version of the data file. Back-end computing platform 102 may assign the updated workflow as an associated workflow either automatically based on user input. Further, back-end computing platform 102 may, in response to assigning the updated workflow, automatically initiate the updated workflow assigned to the revised version of the data file.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed operations for training and utilizing machine-learning models in the manner described herein to cluster projects based on their similar features and using the clustered projects to predict parameter values of another similar project may not be limited to only construction projects. Rather, the disclosed operations could be used in other contexts in connection with other types of projects as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
   a network interface;
   at least one processor;
   at least one non-transitory computer-readable medium; and
   program instructions stored on the at least one non-transitory computer-readable medium that are executable by the at least one processor such that the computing platform is configured to:
      provide a common data environment (CDE) for electronic data files that serves as a source of truth for electronic data files associated with a construction project;
      receive, from a first client station, a data file;
      based on determined categories of metadata that have more influence compared to other categories with respect to determining workflows to be carried out with respect to data files, obtain, from a set of metadata associated with the data file, a subset of metadata associated with the data file;
      input the obtained subset of metadata into one or more machine-learning models, wherein the one or more machine-learning models are trained based on historical data regarding workflow assignments for construction projects;
      use the one or more machine-learning models to output, for each respective workflow in a universe of workflows that are available for assignment to data files, a predicted likelihood that the respective workflow is appropriate for the data file;
      determine, based on the predicted likelihoods and a predefined threshold value, at least one recommended workflow for assignment to the data file, wherein each workflow of the at least one recommended workflow (i) defines a set of one or more actions that are to be taken in connection with the data file and (ii) is associated with a respective predicted likelihood that exceeds the predefined threshold value;

display, via a second client station, a graphical user interface (GUI) including a user-selectable button presented to a user to select a given recommended workflow for assignment to the data file, wherein the user-selectable button presented to the user includes an element to select an indicator that allows the user to dismiss the given recommended workflow as an option for assignment to the data file;

prior to promoting the data file to the CDE, assign a selected workflow from the at least one recommended workflow as an associated workflow for the data file;

in response to assigning the selected workflow from the at least one recommended workflow as an associated workflow for the data file, automatically initiate the selected workflow by generating a communication regarding the selected workflow and sending, to a third client station that is associated with an individual responsible for performing a first action of the selected workflow, the communication regarding the selected workflow, wherein the communication regarding the selected workflow includes information about the data file, an action required, and a due date of the action; and after the selected workflow is completed, promote the data file to the CDE.

2. The computing platform of claim 1, wherein the obtained subset of metadata comprises at least one of: metadata generated by the computing platform or metadata that has been received from one or more client stations.

3. The computing platform of claim 1, wherein the obtained subset of metadata comprises metadata from a plurality of categories of metadata, wherein the plurality of categories are less than all available categories of metadata associated with the metadata currently stored for the data file.

4. The computing platform of claim 1, further comprising program instructions stored on the at least one non-transitory computer-readable medium that are executable by the at least one processor such that the computing platform is configured to:

obtain updated metadata associated with the data file; and
determine, based at least in part on the updated metadata, an updated workflow for assignment to the data file.

5. The computing platform of claim 4, further comprising program instructions stored on the at least one non-transitory computer-readable medium that are executable by the at least one processor such that the computing platform is configured to:

assign the updated workflow as an associated workflow for the data file; and
in response to assigning the updated workflow, automatically initiate the updated workflow assigned to the data file.

6. The computing platform of claim 1, wherein the first client station and the second client station are the same client station.

7. The computing platform of claim 1, wherein the third client station is different than the first client station and the second client station.

8. A non-transitory computer-readable medium, wherein the non-transitory computer-readable medium is provisioned with program instructions that, when executed by at least one processor, cause a computing platform to:

provide a common data environment (CDE) for electronic data files that serves as a source of truth for electronic data files associated with a construction project;

receive, from a first client station, a data file;

based on determined categories of metadata that have more influence compared to other categories with respect to determining workflows to be carried out with respect to data files, obtain, from a set of metadata associated with the data file, a subset of metadata associated with the data file;

input the obtained subset of metadata into one or more machine-learning models, wherein the one or more machine-learning models are trained based on historical data regarding workflow assignments for construction projects;

use the one or more machine-learning models to output, for each respective workflow in a universe of workflows that are available for assignment to data files, a predicted likelihood that the respective workflow is appropriate for the data file;

determine, based on the predicted likelihoods and a predefined threshold value, at least one recommended workflow for assignment to the data file, wherein each workflow of the at least one recommended workflow (i) defines a set of one or more actions that are to be taken in connection with the data file and (ii) is associated with a respective predicted likelihood that exceeds the predefined threshold value;

display, via a second client station, a graphical user interface (GUI) including a user-selectable button presented to a user to select a given recommended workflow for assignment to the data file, wherein the user-selectable button presented to the user includes an element to select an indicator that allows the user to dismiss the given recommended workflow as an option for assignment to the data file;

prior to promoting the data file to the CDE, assign a selected workflow from the at least one recommended workflow as an associated workflow for the data file;

in response to assigning the selected workflow from the at least one recommended workflow as an associated workflow for the data file, automatically initiate the selected workflow by generating a communication regarding the selected workflow and sending, to a third client station that is associated with an individual responsible for performing a first action of the selected workflow, the communication regarding the selected workflow, wherein the communication regarding the selected workflow includes information about the data file, an action required, and a due date of the action; and after the selected workflow is completed, promote the data file to the CDE.

9. The non-transitory computer-readable medium of claim 8, wherein the obtained subset of metadata comprises at least one of: metadata generated by the computing platform or metadata that has been received from one or more client stations.

10. The non-transitory computer-readable medium of claim 8, wherein the obtained subset of metadata comprises metadata from a plurality of categories of metadata, wherein the plurality of categories are less than all available categories of metadata associated with the metadata currently stored for the data file.

11. The non-transitory computer-readable medium of claim 8, further comprising program instructions stored on the non-transitory computer-readable medium that are executable by the at least one processor such that the computing platform is configured to:
obtain updated metadata associated with the data file; and
determine, based at least in part on the updated metadata, an updated workflow for assignment to the data file.

12. The non-transitory computer-readable medium of claim 11, wherein the non-transitory computer-readable medium is also provisioned with program instructions that, when executed by at least one processor, cause a computing platform to:
assign the updated workflow as an associated workflow for the data file; and
in response to assigning the updated workflow, automatically initiate the updated workflow assigned to the data file.

13. The non-transitory computer-readable medium of claim 8, wherein the first client station and the second client station are the same client station.

14. The non-transitory computer-readable medium of claim 8, wherein the third client station is different than the first client station and the second client station.

15. A method carried out by a computing platform, the method comprising:
providing a common data environment (CDE) for electronic data files that serves as a source of truth for electronic data files associated with a construction project;
receiving, from a first client station, a data file;
based on determined categories of metadata that have more influence compared to other categories with respect to determining workflows to be carried out with respect to data files, obtaining, from a set of metadata associated with the data file, a subset of metadata associated with the data file;
inputting the obtained subset of metadata into one or more machine-learning models, wherein the one or more machine-learning models are trained based on historical data regarding workflow assignments for construction projects;
using the one or more machine-learning models to output, for each respective workflow in a universe of workflows that are available for assignment to data files, a predicted likelihood that the respective workflow is appropriate for the data file;
determining, based on the predicted likelihoods and a predefined threshold value, at least one recommended workflow for assignment to the data file, wherein each workflow of the at least one recommended workflow (i) defines a set of one or more actions that are to be taken in connection with the data file and (ii) is associated with a respective predicted likelihood that exceeds the predefined threshold value;
displaying, via a second client station, a graphical user interface (GUI) including a user-selectable button presented to a user to select a given recommended workflow for assignment to the data file, wherein the user-selectable button presented to the user includes an element to select an indicator that allows the user to dismiss the given recommended workflow as an option for assignment to the data file;
prior to promoting the data file to the CDE, assigning a selected workflow from the at least one recommended workflow as an associated workflow for the data file;
in response to assigning the selected workflow from the at least one recommended workflow as an associated workflow for the data file, automatically initiating the selected workflow by generating a communication regarding the selected workflow and sending, to a third client station that is associated with an individual responsible for performing a first action of the selected workflow, the communication regarding the selected workflow, wherein the communication regarding the selected workflow includes information about the data file, an action required, and a due date of the action; and
after the selected workflow is completed, promoting the data file to the CDE.

16. The method of claim 15, wherein the obtained subset of metadata comprises at least one of: metadata generated by the computing platform or metadata that has been received from one or more client stations.

17. The method of claim 15, wherein the obtained subset of metadata comprises metadata from a plurality of categories of metadata, wherein the plurality of categories are less than all available categories of metadata associated with the metadata currently stored for the data file.

* * * * *